June 25, 1968 G. PEDERZOLI ET AL 3,389,464
HEDGE CLIPPER
Filed May 10, 1966
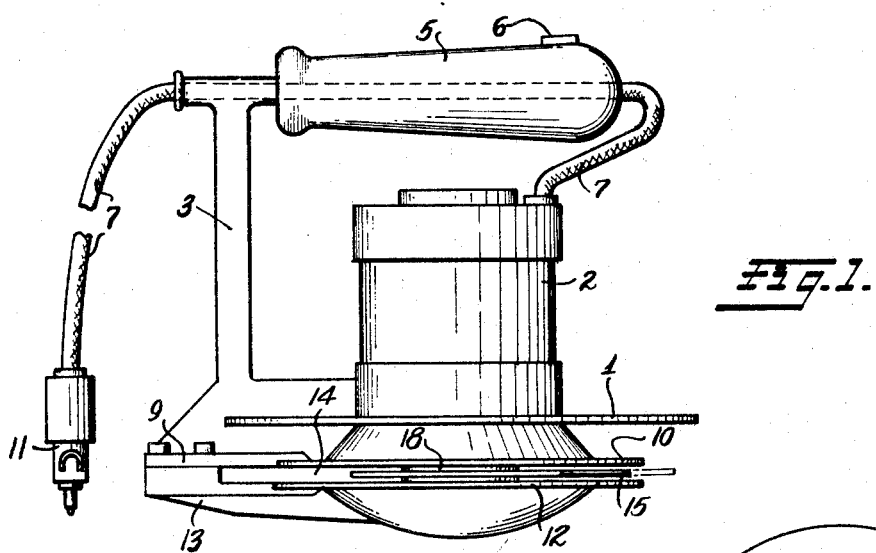
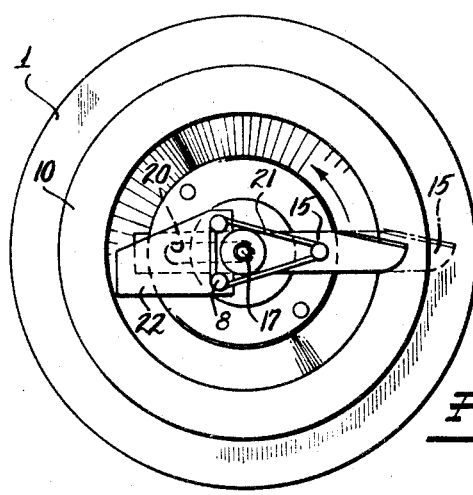
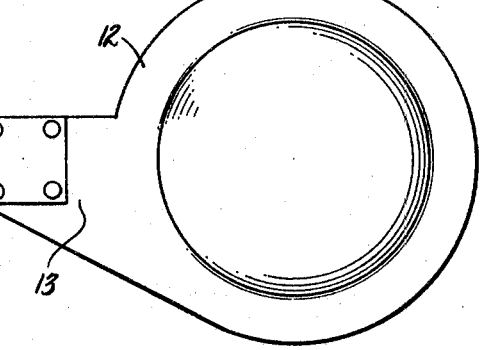
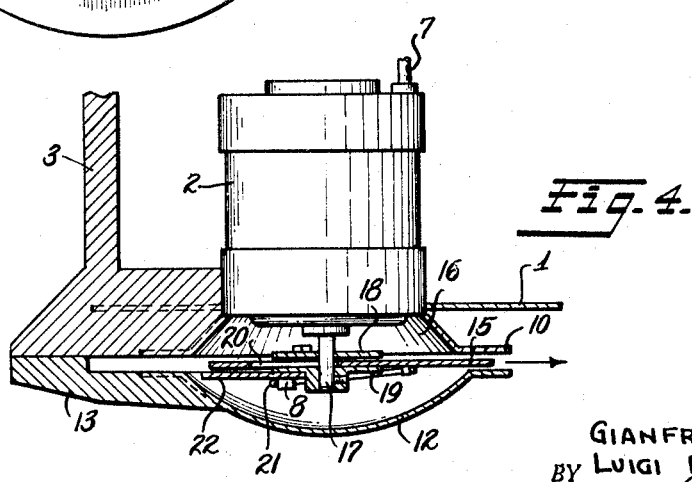
INVENTORS
GIANFRANCO PEDERZOLI
BY LUIGI FORNACIARI
ATTORNEYS

3,389,464
HEDGE CLIPPER
Gianfranco Pederzoli, Reggio Emilia, and Luigi Fornaciari, Modena, Italy, assignors to Emme di Emme
Filed May 10, 1966, Ser. No. 548,932
Claims priority, application Italy, May 10, 1965, 10,520/65
7 Claims. (Cl. 30—264)

This invention relates to a portable electrically driven machine especially adapted for clipping hedges, plants or grasses, but which may be used for other purposes as well.

Due to its reduced weight and rather small dimensions which facilitate its maneuverability and to its low initial and operating cost, it is a very efficient implement within the reach of the most impecunious farmers.

For many years various kinds of power mowers have been known, but all of them work on horizontal planes, assembled on carriages; their mechanical manufacture is rather complicated, their cost is high and they are only suitable for mowing lawns and meadows. They are unfortunately not adapted to clip bushes or plants, at substantial heights or along vertical or inclined planes.

The present machine, which is provided with a handgrip adjacent its lower face, lends itself to being put easily in contact with plants, and bushes to clip them at any height and in any plane, so that it can be used to clip hedges, evergreen plants or borders with horizontal, leaning or moulded contours as well as to mow small lawns.

It works electrically, as it is provided with a portable source of energy which permits it to operate independently of any outside power source for about eight hours in the case of middle-sized models.

Since the machine is very simple and sturdy in construction, it requires very little servicing and performs the clipping-action through rotation of a sharp knife driven directly by the main-shaft, inside a guard-case from which it is projected by the centrifugal force, only when in use, thus making it safe to handle and protecting the cutting-member from casual damage.

According to the invention, the clipping machine consists essentially of a bulged metallic circular plate, with its concave surface facing downward. A small electric motor is welded to the center of the plate and supplied with direct current by a storage-battery installed in a special separate case.

The plate is provided with a radial tailpiece adapted to be coupled to the radial tailpiece of another dished plate of equal diameter. The concave surface of the other plate, however, faces upward so as to form with the first mentioned plate a circular chamber housing the cutting-member.

While the two coupled tailpieces mate with each other and are fastened together by fastening means which facilitate quick disassembly, the circumferential edges of the circular portions of the plates are spaced in order to permit the cutting-blade to come out in a revolving motion, owing to a centrifugal thrust.

The blade is fastened to the drive-shaft and therefore it revolves with the shaft at full speed and, in any case, never less than about 4,500 r.p.m.

The blade is mounted in the following manner. A counterweight is keyed to the drive shaft. This weight comprises a disc provided with a diametral groove within which the cutting-blade slides. The cutting blade is mounted on the revolving shaft by means of longitudinal slot in the blade through which the shaft extends.

As the blade rotates, it is urged radially outward by centrifugal force and projects beyond the two above mentioned plates. When idle, however, a spring or other elastic body withdraws it to a position between the plates themselves.

The counter-weight comprises a tailpiece counterbalancing the centrifugal thrust.

The machine is also provided with a third circular plate greater in diameter than the others. This plate is welded near the base of the motor to the stationary upper plate and provides a protective surface to which a support for a horizontal handle is radially welded. The electrical cable connecting the small engine with the storage battery extends along the handle and is provided with a push-button control.

Other manufacturing and functional features of the machine will become apparent from the following description of a preferred embodiment of the invention, with reference to the accompanying drawings, in which:

FIG. 1 is a side view showing the clipping machine as a whole;

FIG. 2 is a bottom plan view with the lower plate removed showing on an enlarged scale only the dished part of the upper plate, and the cutting blade;

FIG. 3 is a bottom plan view showing the lower plate; and

FIG. 4 is a vertical axial section with the motor not sectioned.

Referring now to FIG. 1, it will be seen that the screening plate 1 carries an electrical motor 2 welded to its center, and a radially projecting rib 3, which in turn carries the wooden handgrip 5, which is provided with a press-switch 6.

FIG. 1 shows the electrical cable 7 with its plug 11 which connects the small motor to the storage battery, but the battery is not shown in the figure.

The radial rib 3 is attached to the rectangular tailpiece 9 of the upper bulged plate 10, the diameter of which is less than that of the screening plate 1, with which it is integral.

The lower plate 12 having a diameter equal to that of the plate 10, is fastened to the latter, with its convex surface downward, by means of its radial tailpiece 13, the profile of which is shown in FIG. 3.

This shape is important because it causes the clippings to be ejected towards the outside of the plates. These clippings would otherwise tend to be carried between the two plates 10, 12, and eventually prevent the cutting blade from rotating freely.

The two plates 10, 12 are fastened together at the tailpieces 9, 13 by a wing-screw and nut system or in any other manner which will permit the lower plate to be easily removed so that the cutting-blade may be replaced or inner parts lubricated.

The radial tailpiece 13 is recessed at 14 so as to allow clearance for the blade 15 as it rotates.

The drive-shaft 17, which extends into the chamber 16 housing the cutting blade, carries keyed thereto a balancing weight consisting of two plates 18, 19 coupled diametrically and defining a channel within which the blade 15 provided with the slot 20 and carried by the revolving shaft 17, slides to and fro.

A spring or other elastic restraining means 21 which is properly calibrated and stretched between an anchorage point on the body of the blade and a stationary anchorage point 8 on the revolving balance weight 18 allows the blade to slide within said channel and project outwardly under the influence of centrifugal force beyond the peripheries of the plates so that clipping may be effected while withdrawing it inside the peripheries of the plates when the centrifugal effect ceases.

The bulge in the lower plate forms the base of the apparatus, the tilting of which makes it possible to clip at various angles with respect to the horizontal.

The plate 19 is provided with a tailpiece 22, which projects outwardly in a direction opposite to that of the blade so as to balance the blade.

What is claimed is:

1. A portable rotary cutting machine comprising two plates having concave portions and registering parallel projecting portions extending outward from the edges of said concave portions, said projecting portions being fastened together with the concave sides of said concave portions facing and spaced from one another to define a central chamber surrounded by an annular slot, a motor mounted on one of said plates, a drive shaft driven by said motor extending centrally into said chamber, a cutting blade carried by said shaft, means mounting said blade on said shaft and constraining said blade to rotate with said shaft in the plane of said slot but permitting said blade to slide radially with respect to said shaft until it projects from said slot, and resilient means urging said blade toward a radially inward position relative to said shaft, in which position said blade is retracted within said slot.

2. A rotary cutting machine as claimed in claim 1 in which said motor is a direct current electrical motor and comprising a portable battery and means for electrically connecting said battery to said motor.

3. A rotary cutting machine as claimed in claim 1 comprising a screening plate mounted on said motor substantially parallel to said slot and larger in diameter than said plates, together with a handle carried by said screening plate, an electrical cord connected to said motor extending along said handle, and a push-button control for said cord carried by said handle said motor being of the electrical type.

4. A machine as claimed in claim 1 in which said mounting means forms part of a counterweight which counterbalances said blade when said shaft rotates.

5. A machine as claimed in claim 4 in which said resilient means connects said blade and said counterweight.

6. A machine as claimed in claim 4 in which said mounting means is a counterweight comprising two pieces fixed to said shaft and defining a guide in which said blade is radially slidable, said blade being provided with a slot through which said shaft projects.

7. A machine as claimed in claim 1 in which said projecting portions form together a compound projection having a surface tangential to the peripheries of said circular portions.

References Cited

UNITED STATES PATENTS

| 2,197,561 | 4/1940 | Orr | 30—276 |
| 2,242,524 | 5/1941 | Hunt | 30—276 |
| 2,740,249 | 4/1956 | Stearns | 56—295 |
| 2,939,264 | 6/1960 | Kontis | 56—295 |

ROBERT C. RIORDON, *Primary Examiner.*

J. C. PETERS, *Assistant Examiner.*